United States Patent [19]

Chang et al.

[11] Patent Number: 5,500,082
[45] Date of Patent: Mar. 19, 1996

[54] DEINKING OF XEROGRAPHIC PRINTED WASTEPAPER USING LONG CHAIN ALCOHOL

[75] Inventors: Hou-Min Chang; Tien-Wang Wu; John A. Heitmann, all of Raleigh, N.C.

[73] Assignee: North Carolina State University, Raleigh, N.C.

[21] Appl. No.: 54,179

[22] Filed: Apr. 26, 1993

[51] Int. Cl.⁶ .................................................. D21C 5/02
[52] U.S. Cl. .................................................. 162/5; 162/77
[58] Field of Search .............................. 162/4, 5, 77, 75; 252/173

[56] References Cited

U.S. PATENT DOCUMENTS

| | | | |
|---|---|---|---|
| 2,005,742 | 6/1936 | Hines | 92/9 |
| 3,069,307 | 12/1962 | Boaz et al. | 162/5 |
| 3,392,083 | 7/1968 | Illingworth | 162/5 |
| 3,635,788 | 1/1972 | Braun et al. | 162/4 |
| 3,635,789 | 1/1972 | Green, Jr. | 162/5 |
| 3,932,206 | 1/1976 | Illingworth et al. | 162/5 |
| 4,162,186 | 7/1979 | Wood et al. | 162/5 |
| 4,231,841 | 12/1980 | Calmanti et al. | 162/5 |
| 4,276,118 | 6/1981 | Quick | 162/5 |
| 4,445,971 | 5/1984 | Lappi et al. | 162/158 |
| 4,561,933 | 12/1985 | Wood et al. | 162/5 |
| 4,666,558 | 5/1987 | Wood et al. | 162/5 |
| 4,935,096 | 6/1990 | Gallagher et al. | 162/5 |
| 4,959,123 | 9/1990 | Lehmann et al. | 162/5 |
| 4,964,949 | 10/1990 | Hamaguchi et al. | 162/5 |
| 5,013,456 | 5/1991 | St. John et al. | 210/734 |
| 5,073,234 | 12/1991 | Mollet et al. | 162/5 |
| 5,102,500 | 4/1992 | Darlington | 162/5 |
| 5,141,598 | 5/1992 | Richman et al. | 162/5 |
| 5,158,697 | 10/1992 | Kawamori et al. | 252/60 |
| 5,225,046 | 7/1993 | Borchardt | 162/5 |
| 5,228,953 | 7/1993 | Bast et al. | 162/5 |
| 5,258,099 | 11/1993 | Borchardt | 162/5 |
| 5,282,928 | 2/1994 | Takahashi et al. | 162/5 |
| 5,288,369 | 2/1994 | Ishibashi et al. | 162/5 |

OTHER PUBLICATIONS

Quick et al. "Xerography Deinking—A Fundamental Approach", *Tappi Journal*, vol. 69, No. 3, pp. 102–106, (Mar., 1986).

Tien-Wang Wu, "Deinking of Xerographic Printing Wastes", Published by D. H. Hill Library, North Carolina State University, Raleigh, North Carolina, Jul. 1992.

*Primary Examiner*—David Lacey Jones
*Assistant Examiner*—Dean T. Nguyen
*Attorney, Agent, or Firm*—Richard E. Jenkins

[57] ABSTRACT

Disclosed is a method of removing ink from xerographically printed paper. The method comprises pulping said printed paper in an aqueous slurry at a non-acidic pH to a consistency of about 8% or less. Next, added to the pulp slurry is a sufficient amount of long chain alcohol, the long chain alcohol having a melting point above room temperature, for a time sufficient with heating at a temperature sufficient, whereby an agglomeration of long chain alcohol and ink particles is formed. Next, the heating is stopped whereby the agglomeration solidifies into particles that settle to the bottom of the pulp slurry. Then, the agglomeration of solidified particles is removed from the pulp slurry thereby leaving a remaining slurry of deinked paper fiber and water. Optionally, the remaining slurry is subjected to flotation to remove substantially any remaining minute ink left particles behind after the agglomeration.

18 Claims, No Drawings

DEINKING OF XEROGRAPHIC PRINTED WASTEPAPER USING LONG CHAIN ALCOHOL

TECHNICAL FIELD

This invention relates to a process for removing ink from printed wastepaper so that the paper may be reclaimed and thus reused. More particularly, the invention relates to deinking paper printed with ink used by laser printers, such as printers from computers and printers from facsimile machines, and printed with ink used by photocopiers. Paper printed by such machines is referred to in the art of printing as xerographically printed paper.

BACKGROUND OF THE INVENTION

For a long time, wastepaper has been a source of fiber material used in paper making. To reclaim the fiber from the wastepaper, it is necessary to remove the ink from pulp fiber when processing the wastepaper for reuse. During reclamation of wastepaper, deinking methods include converting the wastepaper to pulp by macerating pieces of paper in water with agitation. The aqueous pulp slurry is made alkaline and a deinking agent is added. The physical action of pulping the paper in the alkaline aqueous medium causes the ink to separate from the paper pulp fiber. The deinking agent keeps the deinked particles dispersed in the aqueous medium so that the resultant mixture may be subsequently treated to separate the suspended ink from the paper pulp fibers.

Traditionally, fiber from waste paper was employed only in the manufacture of low-grade paper products. With today's emphasis on environmental clean-up, however, more and more reclaimed fiber is being employed in paper making as a result of which methods to upgrade the quality of the reclaimed product are continually being sought.

In the past, the reclaimed paper came from newspapers and books, which are printed with oil-based inks. Such inks are removed from paper by saponification reactions. Several patents serve as background with regard to removal of ink from conventionally printed paper, such as newsprint and books. As can be seen, most of these background patents require a surfactant to keep the deinked particles dispersed throughout the slurry of pulp.

Many of these background patents show the addition of a multi-component agent during pulping. For instance, U.S. Pat. No. 4,959,123, issued Sep. 25, 1990 to Lehmann et al., shows the use of a four-component additive of (a) alkali metal silicate, (b) oxidative bleach, (c) dispersant, and (d) either (i) higher fatty acid or (ii) resonic acid during the pulping operation. U.S. Pat. No. 4,964,949, issued Oct. 23, 1990 to Hamaguchi et al., shows the use of a two-component additive of (a) the reaction product of alkylene oxide+ mixture of (i) natural fat or oil and (ii) polyhydric alcohol and (b) alkylene oxide adduct of (i) higher alcohol, (ii) sulphate, or (iii) higher fatty acid in the pulping operation. U.S. Pat. No. 5,158,697, issued Oct. 27, 1992 to Kawamori et al., shows the addition of the reaction product of alkylene oxide+one of (a) $C_{16-20}$ fatty acid, (b) $C_{17-28}$ ester, or (c) dicarboxylic acid or ester that contains cyclohexene during the pulping operation. U.S. Pat. No. 4,231,841, issued Nov. 4, 1980 to Calmanti et al, shows the addition of a five-component mixture containing surfactant wherein the five components are (a) salt of a fatty acid, (b) nonionic ethoxylated or propoxylated surfactant, (c) anionic surfactant that is a sulfonate, (d) sodium-carboxymethyl-cellulose, +(e) alkaline inorganic salt during the pulping operation.

Other background patents showing the addition of a multi-component agent during pulping are U.S. Pat. No. 4,162,186, issued Jul. 24, 1979 to Wood et al., and U.S. Pat. No. 4,666,558, issued May 19, 1987 to Wood et al., each of which shows the addition of a similar two-component mixture of surfactants during the pulping operation. The two components disclosed in '186 are (a) water soluble nonionic surfactant from $C_{9-15}$ ethoxylated aliphatic alcohol with 7–15 ethyleneoxy units per mole of alcohol+(b) oil soluble nonionic surfactant from $C_{9-15}$ ethoxylated aliphatic alcohol with 0.5–3.5 ethyleneoxy units per mole of alcohol, whereas the two components disclosed in '558 are (a) $C_{9-16}$ alkanol ethoxylate with 6.5–20 oxyethylene units per ethoxylate molecule+(b) oil soluble $C_{9-16}$ alkanol ethoxylate with 0.5–3.5 oxyethylene units per ethoxylate molecule.

Like the two Wood et al. patents, there are two Illingworth patents that are also background showing the addition of a two-component mixture of surfactants during pulping. More particularly, U.S. Pat. No. 3,932,206, issued Jan. 13, 1976 to Illingworth et al., shows the addition of a two-component surfactant mixture of (a) ethoxylated mono-ol+(b) ethoxylated di-ol where the hydroxy groups in the di-ol are present on adjacent non-terminal carbon atoms during the pulping operation. U.S. Pat. No. 3,392,083, issued Jul. 9, 1968 to Illingworth, shows the addition of a two-component mixture of (a) nonionic surfactant having a phenol group+(b) polyol during the pulping operation.

Additionally as background, it is noted that U.S. Pat. No. 4,935,096, issued Jun. 19, 1990 to Gallagher, shows the use of an ionic surfactant during the pulping operation. U.S. Pat. No. 5,013,456, issued May 7, 1991 to St. John et al., involves de-inking of printed paper that was derived from paper that had already been recycled, and uses a water soluble polymer as a coagulant during the pulping operation. The preferred coagulant is polydiallyl dimethyl ammonium chloride polymer containing 5–30 mol. % of water soluble anionic monomer such as acrylic acid in the polymer chain, specifically a copolymer of polydiallyl dimethyl ammonium chloride+ acrylic acid. U.S. Pat. No. 5,073,234, issued Dec. 7, 1991 to Mollet et al., shows the use of a resin precursor which is cured while it is in the pulp during the pulping operation. The resin precursor is a mixture of fluid prepolymers having $\geq 2$ reactive functional groups per molecule, and a cross-linking agent is added to cross-link the prepolymers thereby effecting curing to make a polymer in the pulp, and then the polymer collects the deinked particles. U.S. Pat. No. 3,069,307, issued Dec. 18, 1962 to Boaz et al., shows the addition of ethoxylated phenolic compound as a surfactant during the pulping operation, and specifically state that the pulp must be caustic free.

Lastly as background, U.S. Pat. No. 2,005,742, an old patent issued Jun. 25, 1935 to Hines, discloses a fundamental pulping operation involving shredding newspaper with caustic soda, lime, and sodium silicate, which causes the deinked particles to flocculate at the top of the slurry so that they can be removed by floating them away.

With the increased use, however, over the last few decades of photocopiers, computers, and facsimiles, the source of more and more of reclaimed paper is xerographically printed paper. In contrast to conventionally printed paper, such as newspapers and books, xerographically printed paper uses a special type of ink which contains toners to help the ink stick to the paper. The toners are typically made of a polymer such as polyvinyl butyral, polyacrylate, polystyrene, styrene-acrylate copolymer, and the like. Thus, such toner-containing inks are very difficult to remove from the xerographically printed paper so that the paper may be recycled. A general discussion of xerographic inks and the special problems in deinking paper printed with such inks since they use polymers as toners is in Quick and Hodgson, "Xerography Deinking—A Fundamental Approach", *Tappi Journal*, Vol. 69, No. 3, pp. 102–106 (March, 1986).

More particularly, it is noted that the following five patents involve processes for the deinking of xerographically printed paper.

During deinking of xerographically printed paper, U.S. Pat. No. 4,276,118, issued Jun. 30, 1981 to Quick, shows the addition of a long chain alcohol to the pulping operation, whereby the long chain alcohol agglomerates the deinked particles. Also added during the pulping operation are polystyrene beads to act as what Quick designates a collector for collecting the particles. The polystyrene beads are preferred to be small prills of less than 5 mm in diameter and to have a solubility parameter similar to that of the toner used in the ink. The particles cling to the polystyrene collector, and then the prills with the particles stuck to them are removed from the slurry. Quick is silent as to how these prills containing the particles are supposed to the removed from the slurry.

During deinking of xerographically printed paper, U.S. Pat. No. 4,561,933, issued Dec. 31, 1985 to Wood et al., also shows the addition of a long chain alcohol during the pulping operation to agglomerate deinked particles. Additionally added during the pulping operation is nonionic surfactant. The long chain alcohol in combination with the nonionic surfactant causes the particles to form a suspension so that the particles stay dispersed throughout the slurry. The dispersed particles are then removed by either washing or flotation.

U.S. Pat. No. 5,141,598, issued Aug. 25, 1992 to Richman et al., requires three components to be added to the aqueous slurry of xerographically printed paper during the pulping process. These three components are: (a) aliphatic petroleum distillates, (b) alkylphenoxypoly-(ethyleneoxy) ethanol, and (c) ethoxylated polyoxypropylene glycol, wherein the hydrophile/lipophile balance of (b)+(c)≦10 and the weight ratio of (a):(b):(c) is approximately 6:1:3. Component (a) acts as a solvent and the combination of components (b)+(c) acts as a surfactant. The specification U.S. Pat. No. 5,141,598 to Richman et al. mentions separating the deinked particles from the slurry by flotation.

U.S. Pat. No. 5,102,500, issued Apr. 4, 1993 to Darlington, shows the addition of a polymer having a glass transition temperature of 20°–70° C., together with a substituted polyethylene oxide, to the aqueous slurry of xerographically printed paper during the pulping operation. The specification of U.S. Pat. No. 5,102,500 to Darlington mentions separating the deinked particles from the pulp-containing aqueous medium by conventional centrifugation, filtration, flotation, sedimentation, decantation, or washing. It is noted that the polymers used are either polystyrene or styrene-carboxylic acid copolymer, which are like the polystyrene prills employed as a collector in U.S. Pat. No. 4,276,118 to Quick discussed above.

U.S. Pat. No. 3,635,789, issued Jan. 18, 1972 to Green, involves making a slurry of paper pulp from xerographic printing in which the little deinked particles float to the top and also benzene is added to the slurry. Benzene has a lower specific gravity than water and thus floats on the top of the slurry, thereby collecting the particles. Lastly, the benzene layer containing the particles is skimmed off.

OBJECTS AND SUMMARY OF THE INVENTION

The present invention provides a method of removing ink from xerographically printed paper. The method may further include treatment to make the deinked paper fiber into paper products, such as sheets, cartons, and the like. Thus, during the deinking, at any point after removing the agglomeration from the aqueous pulp as further described below, the method may further include treating the aqueous pulp to remove the water therefrom and convert the deinked paper fiber from the pulp into reclaim paper.

Thus, provided is a method of removing ink from xerographically printed paper comprising: pulping said printed paper in an aqueous slurry, at a pH of about 7 or higher, to a consistency of about 8% or less; adding to said pulp slurry a sufficient amount of long chain alcohol, the long chain alcohol having a melting point above room temperature, for a time sufficient with heating at a temperature sufficient, whereby an agglomeration of long chain alcohol and ink particles is formed; stopping the heating whereby the agglomeration solidifies into particles that settle to the bottom of said pulp slurry; and then removing the solidified agglomeration of particles from the pulp slurry, thereby leaving a remaining slurry of deinked paper fiber and water.

At this point, if a high level of brightness is not desired for the end paper product (such as paper packaging cartons), then the water can be removed and the reclaimed deinked paper fiber made into a paper product. However, at this point, if a high level of brightness is desired for the end paper product (such as sheets of paper for a photocopy machine), then after the step of removing the agglomeration from the aqueous pulp slurry, preferably the method of removing ink from xerographically printed paper optionally includes subjecting the remaining slurry to flotation substantially to remove any remaining minute ink particles left behind. As a result of this preferred method, the slurry contains deinked paper fiber and substantially no ink. Then the water can be removed and the reclaimed deinked paper fiber made into a paper product. The reclaim paper has an ISO brightness of 2.5% better than when said paper was in its original form prior to being xerographically printed, has a dirt area of less than 5 parts per million, and has a dirt count of less than 5 specks per gram.

Thus, it is an object of the present invention to provide a process that does not require hydrocarbons to dissolve the deinked particles.

It is another object of the present invention to provide a process which does not require polymer beads to collect the deinked particles.

It is a further object of the present invention to provide a process which does not require surfactants to keep the deinked particles dispersed throughout the slurry.

Accordingly, it is a feature of the present invention that the invention avoids pollution problems associated with the clean-up of surfactants, hydrocarbons, and polymer beads.

Rather, it is an advantage of the present invention that removal of ink from xerographically printed wastepaper is effected with simplicity. A long chain alcohol agglomerates the deinked particles and the agglomeration sinks to the bottom of the pulp slurry where it is removed by cleaning. Then, in the event that reclaim paper with a high level of brightness is desired, in order to remove any minute ink particles left behind, which cannot be seen in a dirt count of the reclaimed paper but which would affect the brightness of the reclaimed paper, preferably air bubbles are floated through the remaining slurry of paper pulp whereby remaining minute ink particles stick to the air bubbles and are thereby floated away so that any remaining minute ink particles are substantially removed.

Some of the objects, features, and the like of the invention having been stated hereinabove, further objects will become evident as the description proceeds when taken in connection with the accompanying Laboratory Examples as best described hereinbelow.

DETAILED DESCRIPTION OF THE INVENTION

The present invention effects ink removal by a 2-step method of agglomeration and cleaning, and preferably by a 3-step method of agglomeration, cleaning, and flotation (abbreviated as ACF). In general, the method proceeds as follows.

During the agglomeration step, printed paper is made into an aqueous slurry of paper pulp at an alkaline or neutral pH. As is already known in the art, pulping separates the printed paper into paper fibers and deinked particles and thus is the standard operation in de-inking of any printed paper. In the present invention, a long chain alcohol is added to the slurry of paper pulp. The long chain alcohol agglomerates the deinked particles into large particles that sink to the bottom of the slurry.

Next is the cleaning step to remove the agglomerated particles. On a factory scale, preferably removing the agglomerated particles would be done by cleaner selected from the group consisting of a forward centrifugal cleaner, a reverse flow cleaner, a centrifugal pressure screen, or a combination thereof. Typically, forward cleaners remove heavy materials and reverse cleaners remove comparatively lighter materials. Other cleaner equipment could also be used. Beloit Corporation of Beloit, Wisconsin, among other companies, is a manufacturer of such cleaner equipment. In the laboratory, such cleaner equipment was simulated by employing a separatory funnel which had a stirrer disposed through the top thereof in order to create a vortex in the slurry that was inside the separatory funnel. After the agglomerated particles are removed by opening the stopcock in the separatory funnel to allow them to come out of the bottom thereof, preferably, the remainder of the slurry is subjected to a flotation step.

In this flotation step, air is bubbled through the remainder of the slurry. Remaining little ink particles stick to the air bubbles and thus float to the surface forming a froth that is skimmed off. Thus, any remaining ink particles are substantially removed. With the preferred flotation step, it was surprisingly found that the efficiency of ink removal was extremely high. The deinked pulp, when made into reclaim paper, not only had less than 5 ppm (parts per million) dirt area, but also had a brightness that was better than that of new unprinted paper by about 2.5%. Beloit Corporation of Beloit, Wisconsin, among other companies, is also a manufacturer of flotation equipment.

More particulars of this method are given in further detail in accordance with the following description.

Initially, wastepaper is pulped in an aqueous slurry in order to achieve a certain % consistency to allow for mixing of the wastepaper with the water. To facilitate mixing, the wastepaper may be cut into smaller pieces, such as by shredding, chopping, slitting, and the like. The % consistency is based on the dry weight of wastepaper feed. Wastepaper feed is also herein referred to as furnish. The % consistency should be below about 8%, more preferably should range from about 5% to about 1%, and most preferably should range from about 3.5% to about 2.5%. During pulping, the aqueous medium must not have an acidic pH, but rather must be neutral or basic. Accordingly, the pH should range from about 7 to about 11.

The amount of long chain alcohol must be sufficient to cause an agglomeration of ink particles and alcohol. Thus, the % weight of long chain alcohol added to the aqueous slurry of paper pulp preferably should be at least about 1% by weight based on the weight of the dry wastepaper furnish. More preferably, the amount of long chain alcohol should be at least about 1.25%. More alcohol may be employed, but generally that is not necessary for the agglomeration to be effective. Instead, that usually will only increase the cost. Accordingly, about 8% or 9% alcohol based on the dry weight of the furnish could be used, but for cost reasons at most about 6% should be used, more preferably at most about 5%. As the necessary amount of alcohol is the amount sufficient for effective agglomeration of deinked particles, the amount, of course, preferably will increase with the amount of wastepaper in the slurry. Thus, as % consistency increases, preferably so should % alcohol increase.

As further discussed in the next two paragraphs, the process of the invention is performed with heat. Thus various long chain alcohols which would be in the liquid state from the heat may be employed, and there should be enough carbons in the chain so that the alcohol would be solid at room temperature. Optimally, the melting point (hereafter abbreviated as MP) of the alcohol should be less than about 100° C. Straight chain alcohols with one hydroxy group on a terminal carbon are preferred. As straight chain alcohols usually have a higher MP than branched chain alcohols, then an alcohol with more carbons should be used if it is a branched chain alcohol. Optionally, the alcohol may also have aromatic groups, unsaturation, or cyclic groups in the chain. If the hydroxy group of the alcohol is not on a terminal carbon, the hydroxy group should be close to the end of the carbon chain so that the alcohol is polar, whereby one end of the alcohol will attach to the deinked particle and the other end of the alcohol will keep the agglomeration of alcohol-ink dissolved in the water until it is desired to stop the heat and thereby have the agglomerated particles sink to the bottom of the slurry. With regard to alcohols having more than one hydroxy group, those are not preferred because their MP's would be above the 90° C. desired for economical reasons, as further discussed also in the next two paragraphs. Typical long chain alcohols that are suitable include, but are not limited to, a long chain alcohol selected from the group consisting of 1-octadecanol, 1-hexadecanol, 1-tetradecanol, 1-n-$CH_3(CH_2)_{21}OH$, diphenylcarbinol, cinnamyl alcohol, and combinations thereof.

The aqueous slurry of paper pulp is heated and the alcohol is added thereto. The process temperature should range from about 25° C. to about 100° C. and the time should range from about 10 minutes to about 2 hours. More preferably, the temperature should range from about 50° C. to about 90° C. and the time should range from about 15 minutes to about 1 hour. Most preferably, the contact temperature and time of the aqueous slurry of pulp with the alcohol is about 30 minutes at about 75° C. The time needed is that time sufficient for agglomeration and the heat needed is that sufficient to melt the alcohol. The melted alcohol dissolves in the aqueous slurry and agglomerates the deinked particles. Then, when the heating is stopped and the slurry cools, the alcohol solidifies. As it solidifies, it sinks to the bottom of the slurry with the agglomerated deinked particles.

Thus, an alcohol with an MP below room temperature, i.e., an alcohol that is liquid at room temperature, could be employed, but then the process would be more costly because simply stopping the heat would not solidify the alcohol. Instead, the mixture would have to be chilled in order to cause the alcohol to solidify so that the agglomerated deinked particles would sink to the bottom of the slurry. Of course, the limitation on this would be the amount of chilling that would also cause the water to become ice. Likewise, the process should preferably be run below about 90° C. because that temperature is approaching the boiling point of 100° C. for water, and it would be more costly to run the process above these temperatures. Accordingly, an alcohol with an MP above 100° C. could be used, but it would cost more money to melt the alcohol during the process and the process should then be run under pressure which would also cost more money. Thus, the MP of the alcohol should preferably not be above about 90° C. for economical reasons.

As further discussed in the Laboratory Examples below, 1-n-tetradecanol (a 14-carbon alcohol also known as myristyl alcohol and having a melting point of 38° C.), 1-n-hexadecanol (a 16-carbon alcohol also known as cetyl alcohol and having a melting point of 49° C.), and 1-n-octadecanol (an 18-carbon alcohol having a melting point of 58.5° C.) were found to be preferred.

On a factory scale, a cleaner would be used to remove the agglomerated deinked particles as they sank to the bottom of the slurry. Such cleaners are referred to as forward centrifugal cleaners, reverse flow cleaners, or centrifugal pressure screens, and are sold by Beloit Corporation, as well as by other companies. The cleaner creates a centrifugal motion in the slurry resulting in a vortex that causes anything lighter than water to go up and anything heavier, i.e., the agglomerated deinked particles, to go to the bottom of the slurry wherein a valve is opened so that the agglomerated particles can now come out and thus be removed from the slurry.

In the Laboratory Examples below, a cleaner was simulated by using a separatory funnel that had disposed in the top of it a stirring rod. The stirring rod created a centrifugal motion that resulted in a vortex which caused anything lighter than water to go up and the heavier than water agglomerated particles to go to the bottom of the slurry. Near the bottom of the separatory funnel, the stopcock was opened, and the heavier agglomerated deinked particles came out of the bottom.

It is noted that at this point, some minute deinked particles will still remain in the aqueous slurry of paper pulp. As mentioned above, the pulping operation physically separates the printed paper into paper fiber and deinked particles. In contrast to deinked particles from conventionally printed paper, such as newspapers and books, deinked particles from xerographically printed paper are quite large, generally several hundred microns in diameter. The naked eye can see down to about 40 microns. Dirt count is measured in specks per gram and dirt area is measured in parts per million, and thus any remaining minute particles will not have much effect on these measurements. However, these minute particles will affect brightness, which is measured in ISO units with a brightness meter as per TAPPI Standard Method T452 om-87.

Thus, if a high level of brightness is not desired, i.e., the reclaim is made into a product such as a packaging carton where brightness does not matter, then the process of deinking can stop at this point after the removal of the agglomerated particles from the slurry. Then, the water can be removed and the deinked paper fiber made into reclaim paper. However, if a high level of brightness is desired, i.e. the reclaim is to be made into paper sheets with a brightness equivalent to or better than that of new paper so that the reclaim paper can be used just as new bright paper is used, then after the removal of the agglomerated particles from the slurry, further treatment of the slurry of paper pulp is then necessary to remove suspended minute deinked particles therefrom. For this purpose, the present invention suitably makes use of a technique commonly applied in deinking practices and known as flotation. Beloit Corporation of Beloit, Wis., among other companies, is also a manufacturer of flotation equipment.

In flotation, air is bubbled through the slurry of pulp. The deinked particles adhere to the bubbles and float to the surface of the slurry, thereby forming a froth which can be skimmed off. Flotation is commonly used with deinking of conventional inks from newspapers and books, as these deinked particles are typically from about 10 microns to about 100 microns, much smaller than the several hundred micron particle size mentioned above with respect to deinked particles from xerographic printing. Accordingly, flotation is suitable for substantially removing any minute deinked particles still remaining in the aqueous slurry after the cleaning step wherein the agglomerated particles are removed from the slurry.

After the flotation, as further discussed in the Laboratory Examples below, the reclaim from the deinked pulp was made into hand sheets which had less than 5 parts per million (hereinafter abbreviated as ppm) dirt area and had an ISO brightness that was, on the average, better than that of new unprinted paper by about 2.5%.

Furthermore, it will be understood that in addition to pulping, agglomeration, cleaning, and flotation described herein, the invention may be practiced using other process steps as are employed in wastepaper reclamation operations in general and deinking in particular. Certain preferred embodiments of the invention are further illustrated through reference to the following Laboratory Examples.

EXAMPLES

Example 1

Paper was purchased from Econnosource and then xerographically printed for use as the deinking furnish. Each sheet of paper was printed with the same image in order to ensure an identical printing area and amount of ink.

Fifty grams of the printed paper was torn into pieces of about 1 cm$^2$ in size, soaked in tap water for 4 hours, and then diluted to 2000 ml with tap water. This mixture of paper and water was then pulped according to the disintegration procedure described in TAPPI Standard Method T205 om-88. Using 0.5N sodium hydroxide, the pH was adjusted to 10. The consistency of this alkaline aqueous pulp was 2.5%.

Next, agglomeration was conducted using 1-n-octadecanol in a 12 cm diameter by 16.5 cm height stainless steel beaker, which was heated by a constant temperature water bath for 30 minutes at 75° C. The temperature difference between the water in the bath and the pulp slurry was adjusted by the temperature control of the water bath till the desired temperature was reached. During this heating time, the pulp slurry inside the beaker was agitated by a DC motor-driven laboratory stirrer, Yamato LR-41B, which was of variable speed and was capable of maintaining constant speed as viscosity built. The 1-n-octadecanol agglomeration agent was added in an amount of 1.25% after heating the pulp slurry to the desired temperature, and then the temperature was maintained with stirring for the desired time. At the end of the time, the pulp slurry was poured into a glass beaker and cooled down to 50° C., followed by dilution with water as described in the next paragraph.

To effect cleaning after the agglomeration, the following was done. The pulp slurry was diluted to 0.8% consistency with tap water, and approximately 1600 ml of the diluted pulp slurry was poured into a 2-liter Pyrex Squibb separatory funnel, and stirred by a stirrer creating a vortex. The speed of the stirrer was adjusted to keep all of the pulp slurry suspended during 20 seconds of stirring. Then, the stirring was stopped and agglomerated deinked particles settled to the bottom of the separatory funnel from which they were removed by opening the stopcock of the separatory funnel. The remaining pulp slurry was then siphoned out and passed to the flotation stage.

Flotation was carried out in a table-top flotation cell, called the Wemco Agitair flotation machine. DI-600, a commonly used flotation agent, from High Point Chemical Corporation, was added at 0.3% (based on dry furnish) and also added was Ca(++) at 200 ppm (based on dry furnish), followed by mixing prior to the flotation. The Ca(++) was prepared by dissolving $CaCl_2$ in deionized water. Then, 5 liters per minute of compressed air were introduced into the flotation cell to create bubbles for 5 minutes. Froth carrying ink specks was skimmed off during the flotation.

From the resultant deinked pulp slurry, hand sheets were made according to TAPPI Standard Method T205 om-88. In this method, the pulp slurry was diluted to 0.3% consistency using tap water and made into 60 g/m$^2$ hand sheets without further disintegration. The hand sheets were dried in a standard drying ring and air-dried overnight in a paper testing laboratory.

Brightness of the hand sheets was measured by an Elrepho 2000 brightness tester, which was calibrated against pure barium sulfate. Directional reflectance was at 457 nm and was read and expressed as % ISO (TAPPI Standard Method T452 om-87). Dirt of the hand sheets was determined by TAPPI Standard Method T437 om-85. Dirt specks in the hand sheets with an equivalent black area of 0.02 mm$^2$ or more were counted. Two different units were used to express the dirt in the hand sheets made from the reclaimed pulp. These were dirt count expressed as number of dirt specks per gram of pulp and dirt area expressed as mm$^2$ per m$^2$, which is ppm.

A dirt area of less than 5 ppm and a dirt count of less than 5 specks/gram was achieved. The brightness ranged from about 88% ISO units to about 93% ISO units, whereas the brightness of the original unprinted paper was about 87% ISO units. This was achieved with paper printed with a Hewlett-Packard Laser Jet III printer, a Xerox 5100 photocopier, and a Royfax 115 photocopier.

This process was repeated with paper printed with a Saven 7150 photocopier. The desired resultant low levels of dirt and high levels of brightness were achieved with the Saven copier-printed paper when the amount of 1-n-octadecanol was increased from 1.25% to 2% and the amount of DI-600 was increased from 0.3% to 0.6%.

Example 2

To see the effect of the carbon chain length of different alcohols on agglomeration deinking, the process of Example 1 was repeated using the same kind of xerographically printed paper, but the flotation step was left out to save time. The different chain length alcohols used were 1-n-$CH_3(CH_2)_{21}OH$, 1-n-$CH_3(CH_2)_{17}OH$, 1-n-$CH_3(CH_2)_{15}OH$, and 1-n-$CH_3(CH_2)_{13}OH$.

Hand sheets were made, and the brightness was about the same 72% ISO units for each of the 4 different long chain alcohols employed. The dirt area was about 110 ppm for the 22-carbon alcohol, about 30 ppm for the 18-carbon alcohol, about 22 ppm for the 16-carbon alcohol, and about 20 ppm for the 14-carbon alcohol. The dirt count was about 48 specks/g for the 22-carbon alcohol, about 28 specks/g for the 18-carbon alcohol, about 18 specks/g for the 16-carbon alcohol, and about 19 specks/g for the 14-carbon alcohol.

Although the dirt measurements of the hand sheets were better for the 16-carbon alcohol and the 14-carbon alcohol as compared to the 18-carbon alcohol, rather it is preferred to use the 18-carbon alcohol for economic reasons. The reasons are that the 18-carbon alcohol is a derivative of a fatty acid and thus can be obtained from natural resources, as a result of which it is much cheaper than the 14-carbon alcohol or the 16-carbon alcohol.

Example 3

The procedure of Example 1 was repeated with the following changes as noted, and also without the flotation step in order to save time.

Econnosource brand paper printed by a Hewlett-Packard Laser Jet III was used as the deinking furnish. The properties of the Econnosource brand paper before printing were as follows: weight=78 g/m$^2$; brightness=87.1% ISO; caliper= 0.0038 inch; Sheffield smoothness=176/152; moisture=7%; ash content=11.3%.

The first part of the experiment was to see the effect of temperature during the step of agglomeration with the 1-n-octadecanol. First, the paper was pulped into an aqueous alkaline slurry at 50,000 revolutions. A sample was taken at this point and made into hand sheets which were checked for dirt and brightness. The dirt area was 5,810 ppm; the dirt count was 4,600 specks/g; and the brightness was 80.8% ISO.

Next, the aqueous slurry of pulp was placed in a stainless steel beaker to which was added the 1-n-octadecanol with heating via a water bath. Material from the agglomeration was transferred to a Pyrex Squibb separatory funnel with a stirrer. The agglomerated deinked particles were allowed to settle to the bottom of the separatory funnel and removed therefrom. The remaining slurry was then used to make hand sheets, which were tested for brightness, dirt area, and dirt count.

This procedure was repeated, and each time the agglomeration step was performed for 30 minutes, but the temperature was changed. The temperatures used were 60° C., 65° C., 70° C., 75° C., 80° C., and 85° C. For the brightness, it was found that it was about 84% ISO at 60° C., increased to about 87% ISO at 65° C., and then leveled off to about 86% ISO for the temperatures of 70° C. through 85° C. However, at 60° C., both the dirt area of about 240 ppm and the dirt count of about 240 specks/g were unacceptably high, and at 65° C. both had dropped somewhat to a dirt area of about 120 ppm and a dirt count of about 80 specks/g. The dirt area and dirt count both dropped significantly to acceptable levels of about 40 to 50 ppm and about 40 to 50 specks/g, respectively, at 70° C. and stayed at this level for each of the temperatures up through 85° C., with the best results for the lowest dirt area and dirt count (just below 40 ppm and 40 specks/g, respectively) at 75° C. Thus, it was determined that for a heating time of 30 minutes, the preferred temperature was 75° C.

Accordingly, using a heating temperature of 75° C., the experiment was repeated but with using various heating times of 10 minutes, 20 minutes, 30 minutes, 40 minutes, and 50 minutes. For each of the times, the brightness remained essentially unchanged at about 86 to 87% ISO; however, at 10 minutes, the dirt area was about 210 ppm, and the dirt count was about 80 specks/g, both unacceptable. At 20 minutes, the dirt area dropped to about 35 ppm and the dirt count dropped to about 30 specks/g, acceptable levels. The lowest and most desirable levels of dirt area and dirt count occurred at 30 minutes, with no significant improvement when the experiment was repeated at 40 minutes or at 50 minutes, and for these times the dirt area was about 25 ppm and the dirt count was about 25 specks/g. Thus as longer times of 40 minutes and 50 minutes did not cause an improvement in dirt measurements, it appeared that the preferred time was 30 minutes.

Using the time of 30 minutes and temperature of 75° C., the experiment was repeated but with adjusting the pH to different levels. As in Example 1, the pulping was done at pH=10, but then using sulfuric acid and/or sodium hydroxide during the agglomeration step, the experiment was repeated at a pH of 3, 4, 5, 6, 7, 8, 9, 10, and 11.

At the acidic pH of 3, the brightness was about 85% ISO, and at the other pHs the brightness ranged from about 88% ISO to about 89% ISO. At the acidic pHs of 3, 4, 5, and 6, the dirt area ranged from about 35 to about 40 ppm and the dirt count ranged from about 35 to about 40 specks/g. At a higher pH of 10, both the dirt count and dirt area decreased to just under about 20 ppm to about 25 ppm and about 20 specks/g to about 25 specks/g, respectively, with both the dirt area and dirt count being under 20. Accordingly, it was determined that a pH of 10 was the preferred pH.

Also, it is noted that although the agglomeration was apparently rather pH insensitive, it must be kept in mind that the purpose of a neutral or basic pH in the deinking process is fiber swelling and its side effect of assisting in the deinking of the ink from the printed paper during pulping. Thus the pH at the beginning, i.e. at the pulping stage, should not be acidic.

Next, the revolutions in the pulping step were varied between 50,000 rpm and 3,000 rpm, and also the stirrer speed was changed in the agglomeration step from about 600 rpm to about 325 rpm. It was found that the rpm during the pulping step appeared to have no significant effect on the dirt area and dirt count; however, below about 380 rpm for the stirrer speed in the agglomeration step resulted in the stirrer not providing a thorough pulp slurry circulation as a result of which the dirt area increased to about 270 ppm and the dirt count increased to about 170 specks/g.

Finally, with a temperature of 75° C. and a time of 30 minutes, the experiment was repeated with different pulp consistencies ranging from about 0.424% to about 3.392%. Consistencies of 0.424%, 0.848%, 1.272%, 1.696%, 2.12%, 2.544%, 2.968%, and 3,392% were used.

At each of the consistencies, brightness remained at about 86% to about 88% ISO. Dirt area remained in a range of about 25 ppm to about 35 ppm and dirt count remained in a range of about 25 specks/g to about 30 specks/g at consistencies of 0.424%, 0.848%, 1.272%, 1.696% and 2.12%. The most desirable, i.e., lowest levels, of dirt area and dirt count were a dirt area ranging from about 20 to about 26 ppm and a dirt count ranging from about 17 to about 19 specks/g for the % consistencies of 2.544%, 2.968%, and 3.392%. Thus, it was determined that these three consistencies were the preferred consistencies.

Example 4

Using the pilot plant at North Carolina State University, Raleigh, N.C., the procedure of Example 1 was repeated, but, of course, this time on a factory scale, with the following changes. The furnish was 50% laser-printed paper and 50% office copier paper. The pulping temperature and time for the contact with the long chain alcohol were 72.5° C. and 30 minutes, respectively. The long chain alcohol employed was 1-n-octadecanol. The pH was 9.5. The forward cleaner was a Posiflow cleaner made by Beloit, and was operated at 0.7 % concentration. The reverse flow cleaner was a Uniflow cleaner made by Beloit, and was operated at 0.7% concentration. A centrifugal pressure screen was also used to remove large agglomerate particles. For the flotation step, a table-top laboratory flotation machine was employed, using 1.0% concentration, 0.4% DI-600, and 200 ppm Ca++ for a 5-minute run.

At different points during the procedure, samples were taken and made into hand sheets which were tested for brightness, dirt count, and dirt area. The results are summarized in the table below.

TABLE

Deinking Performance

| Sample: | Brightness, % ISO | Dirt Count, specks/g | Dirt Area, ppm |
| --- | --- | --- | --- |
| 1: Original furnish | 77.36 | 5300 | 3100 |
| 2: After pulping | 85.77 | 109 | 880 |
| 3: Screen accept | 88.72 | 86 | 442 |
| 4: Screen reject | 84.11 | 427 | 8550 |
| 5: Forward cleaner accept | 87.38 | 59 | 324 |
| 6: Forward cleaner reject | 68.69 | uncountable | uncountable |
| 7: Reverse cleaner accept | 89.22 | 36 | 91 |
| 8: Reverse cleaner reject | 80.91 | 81 | 202 |
| 9: Flotation accept | 89.26 | 1.5 | 1.1 |

It will be understood that various details of the invention may be changed without departing from the scope of the invention. Furthermore, the foregoing description is for the purpose of illustration only, and not for the purpose of limitation—the invention being defined by the claims.

What is claimed is:

1. A method of removing ink from xerographically printed paper comprising:

(a) pulping said printed paper in an aqueous slurry, at a pH of about 7 or higher, to a consistency of about 8% or less;

(b) adding to said pulp slurry a sufficient amount of long chain alcohol, the long chain alcohol having a melting point above room temperature and being selected from the group consisting of 1-n-tetradecanol, 1-n-hexadecanol, 1-n-octadecanol, 1-n-$CH_3(CH_2)_{21}OH$, diphenylcarbinol, cinnamyl alcohol, and combinations thereof, for a time sufficient with heating at a temperature sufficient, whereby an agglomeration of long chain alcohol and ink particles is formed;

(c) stopping the heating whereby said agglomeration solidifies into particles that settle to the bottom of said pulp slurry; and (d) removing said solidified agglomeration of particles from said pulp slurry, thereby leaving a remaining aqueous slurry of deinked paper fiber and water.

2. The method of claim 1, further including, after removing said solidified agglomeration, then treating the remaining aqueous slurry to remove the water therefrom and convert the deinked paper fiber into reclaim paper.

3. The method of claim 1, wherein the time is from about 10 minutes up to about 2 hours with heating at a temperature from about 25° C. to about 100° C.

4. The method of claim 3, wherein the time is from about 15 minutes to about 60 minutes and the heating is at a temperature from about 50° C. to about 90° C.

5. The method of claim 1, wherein the pH is from about 7 to about 11.

6. The method of claim 1, wherein the consistency is from about 1% to about 8%.

7. The method of claim 6, wherein the consistency is from about 2.5% to about 3.5%.

8. The method of claim 1, wherein the amount of long chain alcohol is from about 1% to about 9% based on the dry weight of the xerographically printed paper prior to pulping in the aqueous slurry.

9. The method of claim 1, wherein said step of removing the agglomeration of long chain alcohol an ink particles is achieved with a cleaner selected from the group consisting of forward centrifugal cleaners, reverse flow cleaners, centrifugal pressure screens, or combinations thereof.

10. A method of removing ink from xerographically printed paper comprising:

(a) pulping said printing paper in an aqueous slurry, at a pH of about 7 or higher, to a consistency of about 8% or less;

(b) adding to said pulp slurry a sufficient amount of long chain alcohol, the long chain alcohol having a melting point above room temperature and being selected from the group consisting of 1-n-tetradecanol, 1-n-hexadecanol, 1-n-octadecanol, 1-n-$CH_3(CH_2)_{21}OH$, diphenylcarbinol, cinnamyl alcohol, and combinations thereof, for a time sufficient with heating at a temperature sufficient, whereby an agglomeration of long chain alcohol and ink particles is formed;

(c) stopping the heating whereby said agglomeration solidifies into particles that settle to the bottom of said pulp slurry;

(d) removing said solidified agglomeration of particles from said pulp slurry, thereby leaving a remaining aqueous slurry of deinked paper fiber and water; and (e) subjecting the remaining slurry to flotation substantially to remove any remaining minute ink particles left behind after the agglomeration.

11. The method of claim 10, further including, after the flotation, treating the aqueous slurry to remove the water therefrom and convert the deinked paper fiber into reclaim paper, said reclaim paper having an ISO brightness of 2.5% better than when said paper was in its original form prior to being xerographically printed, having a dirt area of less than 5 parts per million, and having a dirt count of less than 5 specks per gram.

12. The method of claim 10, wherein the time is from about 10 minutes up to about 2 hours with heating at a temperature from about 25° C. to about 100° C.

13. The method of claim 12, wherein the time is from about 15 minutes to about 60 minutes and the heating is at a temperature from about 50° C. to about 90° C.

14. The method of claim 10, wherein the pH is from about 7 to about 11.

15. The method of claim 10, wherein the consistency is from about 1% to about 8%.

16. The method of claim 15, wherein the consistency is from about 2.5% to about 3.5%.

17. The method of claim 10, wherein the amount of long chain alcohol is from about 1% to about 9% based on the dry weight of the xerographically printed paper prior to pulping in the aqueous slurry.

18. The method of claim 10, wherein removing the agglomeration of long chain alcohol and ink particles is achieved with a cleaner selected from the group consisting of forward centrifugal cleaners, reverse flow cleaners, centrifugal pressure screens, or combinations thereof.

* * * * *